Patented Oct. 21, 1941

2,259,782

UNITED STATES PATENT OFFICE 2,259,782

LIME COMPOSITION

Foster Dee Snell, New York, N. Y., assignor to Foster Dee Snell, Inc., a corporation of New York No Drawing. Application March 11, 1939, Serial No. 261,306

3 Claims. (Cl. 106—119)

This invention relates to a lime composition, particularly to a quicklime composition adapted for use in making water repellent mortar.

Various admixtures for waterproofing lime have been added at the time of mixing the lime with water. Thus, there have been proposed the addition of aluminum stearate or calcium stearate in preformed condition, a solution of ammonium stearate, or a fatty material such as tallow.

There are disadvantages inherent in all these processes or compositions. There has been difficulty, particularly, in making a quicklime composition suitable for use in water repellent mortar while preserving readiness of slaking of the lime. It is an object of the invention to make a mortar possessing both the desired water repellence and satisfactory slaking characteristics. Another object is the provision of a composition adapted to give on slaking a mortar that is exceptionally fat and free from contaminating inert material such as a filler. Other objects and advantages of the invention will appear from the description that follows.

In the preferred embodiment, the invention comprises an admixture of quicklime with a soluble material adapted to react with the lime substantially completely during slaking, with the production of a water repellent, insoluble soap. The invention comprises also the admixture of a soap of the type of sodium stearate with finely divided quicklime in advance of the addition of water for slaking.

The invention is illustrated in greater detail by description in connection with the following specific examples.

Pulverized lime of calcium content that is normal in usual limes is mixed dry with a sodium soap. Thus, there is used a pulverized lime that is substantially completely of such degree of fineness as to pass through a screen having 100 meshes to the linear inch and to be retained largely on a 150-mesh screen. The lime is mixed dry with a commercial sodium soap such as one consisting largely of sodium stearate or palmitate, possibly with a substantial amount of sodium oleate or the like. The soap used is preferably finely divided.

The dry mixture so made is prepared especially for use in making a water repellent mortar, the term "mortar" including plaster or the like.

In order that the lime in the mixture with soap should slake readily and that the resulting mortar when set should be practically waterproof or water repellent, the proportion of the soap used should be 0.1 to 1 part to 100 parts of the quicklime, the proportions being expressed here as elsewhere herein as parts by weight.

With such proportions of the soap, there is no objectionable retarding of the rate of reaction or slaking of the lime composition when water is added. In a standard slaking test, for instance, it has been found that at least 80 per cent of the total rise in temperature produced during the slaking is obtained during the first 3 minutes of contact of the slaking water with the lime. In making this test 200 parts of water are added rapidly to and stirred with 50 grams of the lime composition. The water used is initially at a temperature of 25° C. The rise in temperature is noted each minute until the maximum temperature is reached, loss of heat to the atmosphere being decreased by conducting the slaking within an insulated vessel, as within a double walled tube of glass, the wall space of which is evacuated in the manner of the Dewar flasks but differs from them in not containing any reflecting metal.

Since the lime and soap are premixed, that is, thoroughly intermingled in dry form before the slaking water is added, the two ingredients react, to produce the insoluble soap simultaneously with the combination of the lime with the water. The soap and hydrated lime are therefore intimately compounded and the resulting mortar is exceptionally fat.

While the invention is not limited to any theory of explanation of the results obtained, I consider that the calcium soap formed in situ is integral with the exterior surface of the particles of lime. The soap is thus considered as so disposed as to be most effective in waterproofing the lime. On the other hand, the soap in proportion present does not interfere with the initiation of slaking of the lime, inasmuch as the water repellent soap is not formed in advance of initiating the slaking.

The mortar is also very repellent to water, as shown by the following tests. Mortar composition containing pulverized quicklime and various proportions of sodium soap (of the kind sold under the name Ivory) were made into pats having each a small depression in the upper surface. The pats were allowed to set and dry for one week. Into the depression of each test piece there was placed 1 cc. of water, evaporation was prevented by a suitable cover, and the time noted for the water to be absorbed. The results of the absorption tests follow:

| Parts of soap to 100 of lime | Time for absorption of 1 cc. water |
|---|---|
| 0 | 1 minute. |
| 0.1 | 47 minutes. |
| 0.2 | 150 minutes. |
| 0.5 | More than 24 hours. |

It will be understood that other soaps may be used in place of the sodium soap, as, for example, the soaps of the other fixed alkali metals. Ammonium soaps are not as satisfactory as those of the fixed alkali metals; difficulties arise, for instance, from the instability of the ammonium soaps in dry form.

For some purposes, it is desirable to make a mixture of lime and soap that is much richer in soap content than the compositions described above. Thus, there may be made dry mixtures of lime and soap ranging from 1 to 10 parts of the soap to 100 parts of lime.

Such rich mixture may be blended with additional lime or with another calcareous cementitious material, as, for example, gypsum plaster, Portland cement, or calcium aluminate cement such as Lumnite, to give a composition to be used, for instance, as mortar or as the plaster of reduced suction described in U. S. Patent 1,792,661 issued to Snell on February 17, 1931. In making such reduced suction plaster, the proportion of the rich soap-lime mixture incorporated with the additional lime is such as to give a final mixture of proportion of soap described in the said patent. In making compositions for other uses, the proportion of the said rich mixture used is so selected as to make the soap content of the whole composition 0.1 to 1 per cent.

Masonry cement, also, may be made with admixed soap. In this case conventional masonry cement or hydraulic lime is mixed dry with 0.1 to 1 part of the soap to 100 parts of the calcareous cementitious material, the soap being supplied as such or in a rich lime-soap mixture of kind described above.

For some purposes granular or lump lime may be substituted for the pulverized lime described above. However, there is a substantial retardation of the slaking time when the granular or lump lime is substituted for the pulverized lime, particularly with very large proportions of soap present. Mixtures of granular quicklime of usual commercial grade and soap in the proportions stated, when slaked under the conditions of the standard test described, develop at least 80 per cent of the maximum rise of temperature within 6 minutes of the time of starting the slaking.

While hydrated lime may be substituted for quicklime, the use of the former does not give results as good as those obtained with the use of quicklime.

It will be understood that the term quicklime as used herein means unslaked lime. It will be understood, also, that the details given are for the purpose of illustration, not restriction, and that variations within the spirit of the invention are intended to be included in the scope of the appended claims.

I claim:

1. A dry mixture to be slaked, consisting largely of quicklime and a fixed alkali metal soap, the proportion of the soap being of the order of 0.1 to 1 part to 100 parts of lime, the quicklime being adapted to combine with moisture condensed in the mixture during storage, and the quicklime and soap being adapted to remain in unreacted condition until liquid water is added, the slaking of the lime and reaction of the lime with the soap then occurring at the same time.

2. A dry mixture to be slaked and used in mortar or the like, consisting largely of quicklime and a sodium soap, the said mixture containing 0.1 to 1 part of the soap to 100 parts of quicklime, the quicklime being adapted to combine with moisture condensed in the mixture during storage, the quicklime and soap being adapted to remain in unreacted condition until liquid water is added, the slaking of the lime and reaction of the lime with the soap then occurring at the same time, and the mixture being adapted, when slaked with four times its weight of water initially at 25° C., to develop within 6 minutes at least 80 per cent of the total rise in temperature resulting from the slaking.

3. An admixture for a hydraulic calcereous cementitious material, the said admixture consisting largely of quicklime and a soluble soap, the proportion of soap being 1 to 10 parts to 100 parts of the lime.

FOSTER DEE SNELL.